April 13, 1926.
J. S. GREGORIUS
1,580,135
APPARATUS FOR MAINTAINING THE LEVEL IN GLASS TANKS
Original Filed Dec. 3, 1924   2 Sheets-Sheet 2
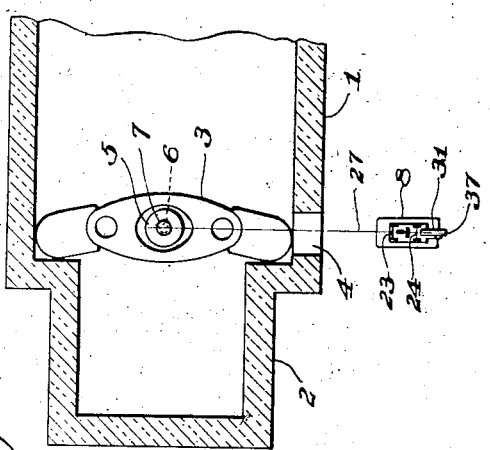
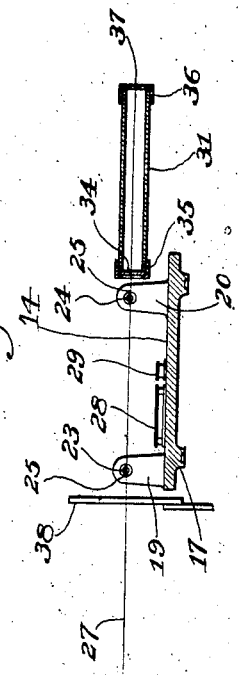
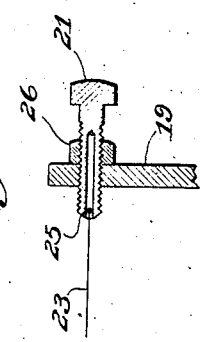
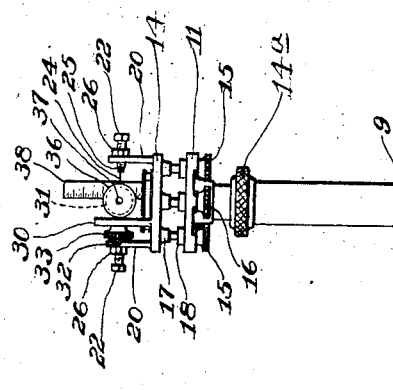
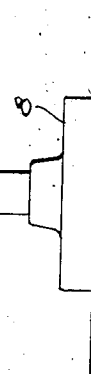
INVENTOR Patented Apr. 13, 1926.

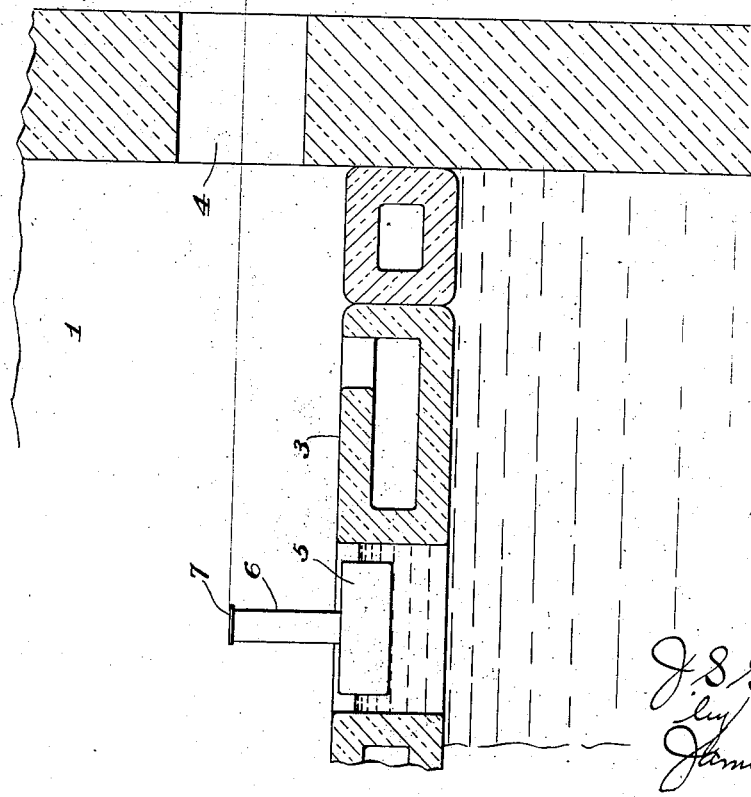

1,580,135

UNITED STATES PATENT OFFICE.

JOSEPH S. GREGORIUS, OF MOUNT VERNON, OHIO, ASSIGNOR TO PITTSBURGH PLATE GLASS COMPANY, A CORPORATION OF PENNSYLVANIA.

APPARATUS FOR MAINTAINING THE LEVEL IN GLASS TANKS.

Application filed December 3, 1924, Serial No. 753,639. Renewed October 16, 1925.

*To all whom it may concern:*

Be it known that I, JOSEPH S. GREGORIUS, a citizen of the United States, and a resident of Mount Vernon, in the county of Knox and State of Ohio, have made a new and useful invention in Improvements in an Apparatus for Maintaining the Level in Glass Tanks, of which the following is a specification.

The invention relates to apparatus for use with glass melting tanks for assisting in the maintenance of the glass level at a constant point. This maintenance of the level is of particular importance in those cases in which a continuous ribbon or sheet of glass is drawn from the tank and in which the level of the clay work adjacent the line of generation of the sheet must bear a definite relation to the level of the glass. This is also important in those cases in which a variation of the level of the glass causes a variations in the amount of heat supplied to the extension from which the drawing occurs, as it is desirable to maintain constant temperature conditions in such extension. Because of the heat conditions in a regenerator melting tank, it is a very difficult matter to determine the level of the glass in the furnace by means of marks on the inner face of one of the walls, as such marks become obliterated and have no sharp definition at any time when observed from the distance required by the severe heat conditions. The present invention is designed to provide a reliable means for determining with exactness and without difficulty or inconvenience the exact level of the glass at any time. One embodiment of the invention is illustrated in the accompanying drawings wherein:

Figure 1 is a partial section and partial side elevation of the apparatus in position of use. Fig. 2 is a diagrammatic cross sectional view in a horizontal plane showing the drawing tank with the apparatus in position of use. Fig. 3 is a rear elevation of the sighting device. Fig. 4 is a vertical longitudinal section through the sighting device. And Fig. 5 is a detail sectional view on the line V—V of Fig. 1.

Briefly stated, the apparatus comprises a float located in the glass batch in position to be observed through an opening in the side wall of the tank, and a sighting device located outside the tank, by means of which the vertical level of the float in the tank may be determined. This sighting device may be constructed in various ways, but in its simplest form it comprises a leveling device carrying a pair of spaced sighting wires, and a scale past which the line of sight extends, so that the observer in lining up the two wires with a mark upon the float can also see the scale and in this way determine the vertical position of the float. In so far as the scale is concerned, it is not necessary to know the height of the line of sight with respect to any fixed point, but only to have a measuring element which will indicate the relative vertical position of the float. Once the proper level of glass has been determined in connection with the corresponding point upon the scale of the line of sight, it is only necessary that this point should be marked upon the scale and the level of the glass adjusted so that the float always rests at the same level.

A sighting tube is preferably employed with the device having in one end a colored glass to protect the eye of the observer from the intense light and heat, but this is a refinement which might be dispensed with.

Referring now to the drawings, 1 is a melting tank; 2 is a forehearth from which the glass may be drawn or removed in any desired way; and 3 is a floater or skimmer of refractory material lying between the two portions of the tank; 4 is an opening through the side wall of the tank through which the floater is positioned; and 5 is a float also of refractory material located in one of the openings which is cored out vertically through the floater or skimmer 3.

The relation of the float 5 to the opening 4 and the sighting device, will be seen by reference to Fig. 1, the float preferably being provided with a column 6, whose upper edge 7 acts as an indicator for gauging the vertical position of the float when used in connection with the sighting device.

The sighting device comprises a base 8, having a hollow vertical standard 9, in which is slidably mounted the tube 10, carrying at its upper end the plate 11. This plate is secured to the tube 10 by means of a bolt 12, beneath which is a washer 13. The tube is adjusted vertically by means of a nut 14ª; threaded onto the stem and resting upon the top of the standard 9. The plate 11 is provided with three adjusting screws for leveling up the plate 14, which carries the sighting device. Two of these screws 15, 15 are at the forward end of the plate 11, while the third one 16 is located at the rear end of the plate. They are threaded into bosses 17 on the under side of the plate 14 and are swivelled in the plate 11 by means of collars 18 which are secured to the stems of the screws by means of pins.

Mounted upon the plate 14 are two pairs of uprights 19 and 20, such uprights carrying the pairs of screws 21 and 22. Between these pairs of screws extend the sighting wires 23 and 24. These wires are preferably secured to the screws as indicated in detail in Fig. 5, the end of the wire being drawn laterally through the opening 25 in the hollow stem of the screw, and the screw being secured in position after the wire is tightened by means of a lock nut 26. These two wires determine the line of sight 27 (Fig. 1) and this line of sight is made horizontal in both directions by means of the pairs of levels 28 and 29.

At the rear end of the plate 14 is a third upright 30, which carries the sighting tube 31. The sighting tube is provided with the threaded stem 32 which extends through the slot in the upright 30 and is engaged by the clamping nut 33. By this means the tube may be adjusted vertically and also tilted, until the line of sight is in line with the observation opening at the rear end of the tube. The construction of the tube is shown in Fig. 4. A piece of colored glass 34 is clamped against the front end of the tube by means of a screw cap 35, while the rear end is provided with a cap 36, having the sighting opening 37 therethrough. Mounted adjacent the line of sight is the scale 38, such scale being secured to the standard 9, and being closely adjacent to the line or sight 27, so that when the line of sight is in alignment with the indicating plane 7 on the float, the position of such line of sight can be read upon the scale.

Having once determined the proper elevation of the line of sight, as indicated by the scale, it is easy to determine the level of the glass in the tank by noting how much above or how much below the indicating flange has moved with respect to the point which has been determined upon the scale. By the use of this apparatus, the level of the glass may be determined without difficulty at any time and may be depended upon within a small fraction of an inch, perhaps $\frac{1}{32}$nd or $\frac{1}{16}$th of an inch, which is sufficient for all practical purposes, batch being fed into the furnace at a sufficient rate to always keep the level of the glass at the point which has been determined upon as the most expedient for operation.

As indicated in Figs. 1 and 2, the float 5 is mounted in one of the cored out openings through the skimmer 3, so that it is free to move up and down but is prevented from moving from its position adjacent the observation 4. The opening 4 is the one through which the skimmer 3 is inserted into the furnace, such opening being partially filled up after the skimmer is positioned, but it will be understood that an observation at some other point through one of the furnace walls might be used and that the float might be located in some other part of the furnace. Also that the invention might be applied to any form of glass furnace in which it is desirable to maintain a constant level in the tank. In some cases the float is located in the tank behind the skimmer bar.

What I claim is:

1. The combination with a glass furnace, having an observation opening in one of its walls, of a float or refractory material in position to be observed through said opening, a sighting device on the outer side of said wall in line with said opening, and means for determining the vertical position of the line of sight of such sighting device.

2. The combination with a glass furnace, having an observation opening in one of its walls, of a float of refractory material in position to be observed through said opening, a sighting device on the outer side of said wall in line with said opening, leveling means therefor, and means for determining the vertical position of the line of sight of such sighting device.

3. The combination with a glass furnace, having an observation opening in one of its walls, of a float of refractory material in position to be observed through said opening, a sighting device on the outer side of said wall in line with said opening, leveling means therefor, means for adjusting said device vertically, and means for determining the vertical position of the line of sight of such sighting device.

4. The combination with a glass furnace, having an observation opening in one of its walls, of a float of refractory material in position to be observed through said opening, a sighting device on the outer side of said wall in line with said opening, and a vertical scale, whose position is fixed adjacent the line of sight of such sighting device in such position that its elevation may be seen by the operator when making his observation of the float.

5. The combination with a glass furnace, having an observation opening in one of its walls, of a float of refractory material in position to be observed through said opening, a sighting device on the outer side of said wall in line with said opening, leveling means therefor, means for adjusting said device vertically and a vertical scale whose position is fixed adjacent the line of sight of such sighting device in such position that its elevation may be seen by the operator when making his observation of the float.

6. The combination with a glass tank having a fixed floater or skimmer therein of refractory material with an opening extending vertically therethrough and also having in its wall an observation opening above the surface of the glass and adjacent such floater, of a float of refractory material lying in said opening in the fixed floater and extending above the top thereof, a sighting device on the outer side of said wall in line with said opening, and means for determining the vertical position of the line of sight of such sighting device.

In testimony whereof, I have hereunto subscribed my name this 18th day of November, 1924.

JOSEPH S. GREGORIUS.